United States Patent Office 2,775,592
Patented Dec. 25, 1956

2,775,592

2-METHYL - 4 - AMINO - 5 - ACETAMINOMETHYL-PYRIMIDINE AND PROCESS FOR ITS PRODUCTION

Akira Takamizawa, Kuise, Amagasaki, Japan, assignor to Shinogi & Co., Ltd., Osaka, Dosho-machi, Higashi-ku, Japan No Drawing. Application December 8, 1953, Serial No. 397,041

5 Claims. (Cl. 260—256.4)

This invention relates to the novel compound 2-methyl-4-amino-5-acetaminomethylpyrimidine and to a process for preparing the same. More particularly, the invention contemplates the provision of a process for the production of this compound involving the condensation of $\beta$-alkoxy-$\alpha$-alkoxymethylenepropionitrile with acetamidine.

2-methyl-4-amino-5-aminomethylpyrimidine is an important compound and is used as an intermediate in the preparation of vitamin B₁ (thiamine hydrochloride). In the past, various methods have been employed in attempting to produce this compound. These known procedures are generally classified to two main groups; one involving the reduction of 2-methyl-4-amino-5-cyanopyrimidine, and the other involving the transformation of 4,5-substituents of 2-methyl-4-substituted pyrimidine-5-acetic acid derivatives. These syntheses may be further subdivided as follows:

*Group I (Reduction of 2-methyl-4-amino-5-cyanopyrimidine)*

(i) Catalytic reduction: Todd, Bergel; J. Chem. Soc., 364 (1937). Grewe; Z. Physiol. Chem. 242, 89 (1937). Japanese Patents Nos. 141,330, 168,968, and 172,429.

(ii) Electrolytic reduction. (This is a sort of catalytic reduction and is not substantially different from the above. The reduction is performed in the liquid phase.) Japanese Patents Nos. 141,330, 168,968, and 171,705.

*Group II (Transformation of 4,5-substituents of 2-methyl-4-substituted pyrimidine 5-acetic acid derivatives)*

(iii) Chorination, acidamination and Hoffmann's decomposition, or Curtius' degradation of 2-methyl-4-hydroxypyrimidine-5-acetic acid.

(iv) Chlorination, amination and hydrolysis of 2-methyl-4-hydroxy-5-benzaminomethylpyrimidine.

(v) Chlorination, amination, acidamination and Hoffmann's decomposition of 2-methyl-4-hydroxy-5-carbethoxymethylpyrimidine. (Described in Andersag, Westphal; Ber., 70, 2035 (1937).) British Patents Nos. 456,571 and 471,416.

In these prior methods, the syntheses of Group I are unsatisfactory because of the fact that the reactions are greatly influenced by the presence of even slight impurities in the cyanopyrimidine starting materials, and precious metals, such as palladium, platinum, and gold, are required as catalyst. Moreover, the procedures necessary for the production of cyanopyrimidine are quite involved, i. e., cyanomethylpyrimidine is generally manufactured as follows:

1. Condensation of ethoxymethylene malonedinitrile with acetamidine (Japanese Patent No. 143,065); or by 2. Obtaining 2 - methyl-4-hydroxy-5-cyanopyrimidine by condensation of acetimidoether with $\alpha$-aminomethylene-cyanoacetate or acetamidine with $\alpha$-ethoxymethylene-cyanoacetate, thereafter chlorinating and aminating the above intermediate. (Todd, Bergel; ibid. Japanese Patent No. 14,324.) Such procedures take a substantial amount of time for completion and require the exercise of careful control measures.

On the other hand, the procedures of Group II are even longer than those of Group I and involve many difficult reactions.

I have discovered that $\alpha$-alkoxymethylene-$\beta$-alkoxypropionitrile which can be obtained by alkylation of alkali metal salt of $\alpha$-formyl-$\beta$-alkoxypropionitrile exists in two isomeric forms. For example, in methylating with dimethyl-sulfate Na-enolate of $\alpha$-formyl-$\beta$-ethoxypropionitrile which is derived from $\beta$-ethoxypropionitrile by formylation with sodium ethylate and ethylformate in absolute benzene, a liquid of boiling point 103–104° C. at 3 mm. mercury, an isomeric form hereinafter referred to as (A) is obtained in 90% yield. When the above reaction is carried out in an aqueous methanol solution, the reaction tends to produce an isomeric form comprising a liquid of boiling point 94–96° C. at 3 mm. mercury, hereinafter referred to as (B). Furthermore, when the former reaction mixture is reacted with sodium hydroxide for several hours, isomeric form (B) is obtained in 90% yield. Moreover, when isomeric form (A) is treated with sodium hydroxide in absolute or aqueous equi-volume mixture of ethanol and methanol, isomeric form (A) is theoretically converted into isomeric form (B). Elemental analytical data of (A) and (B) correspond to the empirical formula $C_7H_{11}O_2N$. According to Zeisel's method, they show the existence of a methoxyl group and an ethoxyl group. Therefore, it is obvious that both of the isomeric forms have the composition of $\alpha$-methoxymethylene-$\beta$-ethoxypropionitrile. The infra-red absorption spectrum show absorption bands for (A) occurring at 4.55$\mu$ and 6.11$\mu$ and for (B) occurring at 4.54$\mu$ and 6.09$\mu$. Thus, it is obvious that both isomeric forms have —C≡N and —C=C— unsaturated bonds. From the fact that their dipolemoments are $\mu=4.90D$ (A) and 3.91D (B) respectively, it is known that in both of the geometrical isomers (A) is the cis form and (B) is the trans form of $\alpha$-methoxymethylene-$\beta$-ethoxypropionitrile, as shown by the following formulae:

$$\begin{array}{cc} \text{EtOCH}_2\text{—C—CN} & \text{EtO—CH}_2\text{—C—CN} \\ \| & \| \\ \text{H—C—OCH}_3 & \text{H}_3\text{CO—C—H} \end{array}$$

The physical constants of the homologues of $\alpha$-alkoxymethylene - $\beta$ - alkoxypropionitrile are shown in the following table.

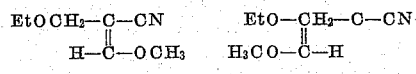

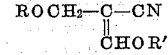

| R | R' | Cis-Trans | Boiling Point | Specific Weight | Index of Refraction |
|---|---|---|---|---|---|
| CH₃ | CH₃ | Cis----- | 105–107° C., 4 mm. Hg | $d_4^{16.5}1.02337$ | $n_D^{20°C}=1.4565$ |
| | | Trans--- | 106–110° C., 7 mm. Hg | $d_4^{16.5}1.01378$ | $n_D^{20°C}=1.4270$ |
| C₂H₅ | CH₃ | Cis----- | 103–104° C., 3 mm. Hg | $d_4^{27}0.99290$ | $n_D^{17°C}=1.4580$ |
| | | Trans--- | 94–96° C., 3 mm. Hg | $d_4^{20}1.98240$ | $n_D^{17°C}=1.4268$ |
| C₂H₅ | C₂H₅ | Cis----- | 109–110° C., 2 mm. Hg | $d_4^{13.5}0.98130$ | $n_D^{14°C}=1.4580$ |
| | | Trans--- | 104–106° C., 3 mm. Hg | $d_4^{16.2}0.96357$ | $n_D^{20°C}=1.4240$ |
| n-C₃H₇ | CH₃ | Cis----- | 104–107° C., 2 mm. Hg | $d_4^{13.8}0.98183$ | $n_D^{20°C}=1.4575$ |
| | | Trans--- | 107–109° C., 3 mm. Hg | $d_4^{18.8}0.96527$ | $n_D^{20°C}=1.4280$ |
| n-C₄H₉ | CH₃ | Cis----- | 127–129° C., 4 mm. Hg | $d_4^{11.2}0.95250$ | $n_D^{20°C}=1.4550$ |
| | | Trans--- | 109–112° C., 4 mm. Hg | $d_4^{20}0.94976$ | $n_D^{20°C}=1.4370$ |

The condensation of cis - α - alkoxymethylene - β - alkoxypropionitrile with acetamidine yields 2 - methyl-4 - amino - 5 - alkoxymethylpyrimidine. The condensation of trans - α - alkoxymethylene - β - alkoxypropionitrile with acetamidine yields colorless, dice-like crystals of melting point, 203–204° C. As a result of further investigations, this compound was identified as 2-methyl-4 - amino - 5 - acetaminomethylpyrimidine. It is believed that this compound is novel and has not been reported heretofore in the literature. All of the homologues of α - alkoxymethylene - β - alkoxypropionitrile when used in the above reaction yield 2 - methyl - 4 - amino-5 - alkoxymethylenepyrimidine. It is to be noted that the term "alkoxy" as used herein is intended to include aliphatics and aralkoxy, substituents which are similar to aliphatic alkyl substituents.

The reaction of the invention may be performed with or without a solvent which dissolves both acetamidine and α - alkoxymethylene - β - alkoxypropionitrile. The solvents which may be used are those chosen from the group consisting of lower aliphatic alcohols, such as methanol, ethanol and propanol or mixtures of one or more of these solvents with benzene, toluene and petroleum ether. Furthermore, although the use of a condensing agent is desirable for purposes of accelerating dealcoholization, such use is not essential to the successful operation of the process. In practice, the use of an alkali substance in excess of equimolecular proportions will affect this result, and, when alkali substances such as the alkali metals and alkaline earth metal hydroxides or carbonates are employed the reaction may be affected at low temperatures.

The intermediate of melting point 104–106° C. (needles) was obtained in this reaction. The substance is ½ mole of innermolecular water and its dehydrate and picrate melts at 172–173° C. and 202–203° C., respectively. The latter exhibit prism or dice-like crystal formations.

The intermediate is found to be identical with that obtained as the condensation product of 2 - methyl - 4 - amino-5-aminomethylpyrimidine with acetimidoether. As the result of my investigations, this intermediate was identified as 2,7 - dimethyl - 5,6 - dihydropyrimido (4,5-d)pyrimidine. Moreover, upon condensing cis - α - alkoxymethylene - β - alkoxypropionitrile with acetamidine in methanolic solution, 2 - methyl - 4 - amino - 5-acetaminomethylpyrimidine is obtained as the primary product and a trace of 2 - methyl - 4 - amino - 5 - alkoxymethylpyrimidine is also obtained.

It is believed that this phenomenon occurs by reason of the transformation of the cis-nitrile to the trans-nitrile under action of the solvent system. In short, the reaction of α - alkoxymethylene - β - alkoxypropionitrile with acetamidine was not predictable from any previously known syntheses. With respect to the mechanism of the reaction, it is believed that the following occurs: the β-position of the trans-nitrile of Formula I below is substituted with one mole of acetamidine, with the formation of α-acetamidinomethylene of Equation II, but ring-closure does not occur since the substituent is present in the trans-position against —C≡N bond. In the case of the cis-nitrile, ring-closure occurs immediately with the production of 2 - methyl - 4 - amino - 5 - alkoxymethyl-pyrimidine.

In the course of the above reaction the α - ethoxyl of Formula II is further substituted with a mole of acetamidine and is closed to the pyrimidine ring, Formula III, and the 4 - amino radical of the pyrimidine condenses with the remaining acetamidino radical to produce the intermediate 2-7 - dimethyl - 5,6 - dihydropyrimidino(4,5-d)pyrimidine, Equation IV.

At the end of the continuous reaction, the compound of Formula IV is moderately autohydrolized to 2-methyl-4 - amino - 5 - acetaminomethylpyrimidine, Formula V.

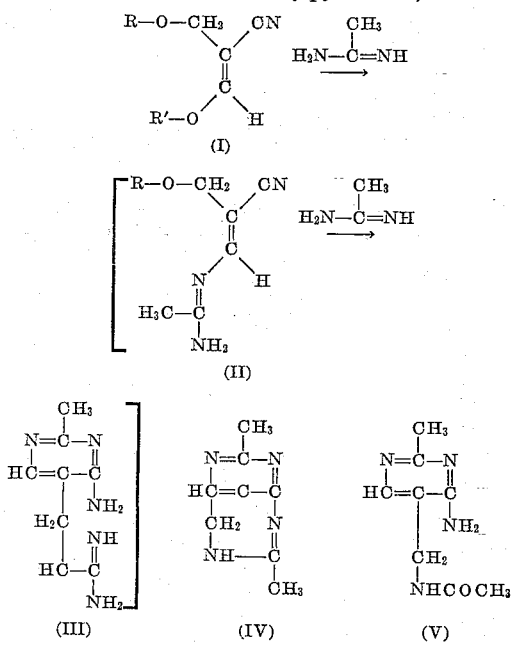

wherein, R, R′ equal alkyl, aralkyl.

The reaction is characterized by extreme smoothness and high purity of the resultant product; in particular, the product of the low temperature reaction following addition of excessive alkali is remarkably pure.

The product 2-methyl-4-amino-5-acetaminopyrimidine of the invention is readily hydrolized to 2-methyl-4-amino-5-aminomethylpyrimidine with theoretical yields and may be converted to 2-methyl-4-acetamino-5-acetaminomethyl-pyrimidine by acylation.

Summarizing the foregoing, it will be seen that the process of the invention is characterized by (1) the use of inexpensive raw materials, (2) speed of reaction, (3) smoothness of reaction, and (4) high purity of end product. The end product is, of course, valuable for use in the manufacture of aminomethylpyrimidine.

The process of the invention is illustrated by the following examples, which are offered by way of illustration only and not with the intent of limiting the scope of the invention.

*Example 1.*—33.5 g. of acetamidine hydrochloride (crystalline) were added to a sodium methylate solution formed of 90 cc. of absolute methanol and 8 g. of metallic sodium. The mixture was agitated for 30 minutes at room temperature, neutralized and then heated at 65–70° C. To this mixture, 19 g. of trans-α-methoxymethylene-β-methoxypropionitrile were titrated and the reaction mixture was refluxed on boiling water-bath for 2 hours. Thereafter the reactant was allowed to stand whereby sodium hydrochloride is removed. Methanol is removed from the reactant solution by distillation and the crystal-like residue was heated with sodium hydroxide solution (1 g. of sodium hydroxide in 30 cc. of water) on boiling water-bath for 1 hour. The reactant was adjusted to pH 6.8 with acetic acid and allowed to stand.

Colorless dice-like crystals were obtained. Furthermore, by salting out the mother liquor, further quantities of the same crystals were obtained. Both crystalline products were identified as 2-methyl-4-amino-5-acetamino-methylpyrimidine, containing ½ mole of innermolecular water. The compound melts at 203–204° C. (recrystallized from water) and exhibits white dice-like or needle-like crystalline form. The crystalline form of its picrate and hydrochloride are needle-like. (M. P., 119–200° C. (needle), M. P., 235° C. (decomp.) respectively.) Yield, 17 g. (60% calculated from theoretical amount).

The compounds may be transferred to 2-methyl-4- amino-5-aminomethylpyrimidine by common hydrolysis with acids on alkalis, with almost theoretical yield. Thus, 5 g. of 2-methyl-4-amino-5-acetaminomethylpyrimidine is dissolved in a mixture of 200 cc. of alcohol and 15 cc. of hydrochloric acid (20%). To this mixture gaseous hydrochloric acid is added to the heated solution on water-bath. 2-methyl-4-amino-5-aminomethylpyrimidine is gradually precipitated from the reaction mixture in crystalline form. The crystals melt at 265° C. (decomposition method) and is found to be identical with authentic 2-methyl-4-amino-5-aminomethylpyrimidine hydrochoride.

*Example 2.*—By using 19 g. of cis-α-methoxymethylene-β-methoxypropionitrile in the process of Example 1, the reaction yields 2-methyl-4-amino-5-acetylaminomethylpyrimidine. The compound melts at 203–204° C. Yield, 17 g., 60%.

*Example 3.*—By using 21.1 g. of trans-α-methoxymethylene-β-ethoxypropionitrile in the process of Example 1, the reaction yields 2-methyl-4-amino-5-acetylaminomethylpyrimidine. The compound melts at 203–204° C. Yield, 17 g., 60%.

*Example 4.*—By using 11 g. of trans-α-benzyloxymethylene-β-ethoxypropionitrile, 12 g. of acetamidine hydrochloride, 2.7 g. of metallic sodium, and 30 cc. of methanol in the process of Example 1, the reaction yields 5.6 g. of 2-methyl-4-amino-5-acetaminomethylpyrimidine. Yield, 58%.

*Example 5.*—21.7 g. of acetamidine hydrochloride were added to sodium ethylate solution formed from 70 cc. of methanol and 6.4 g. of metallic sodium. The mixture was cooled on the ice-bath and agitated for 30 minutes during cooling. To this mixture, 14.1 g. of β-ethoxy-α-methoxymethylenepropionitrile (Formula I, above) were added and the mixture was further agitated for 12 hours. By passing 1.7 g. of gaseous chlorine into the reaction solution, the excess of alcoholate was resolved and sodium hydrochloride filtered off. The solvent was distilled off and the crystal-like residue heated with 30 cc. of water on boiling water-bath for 3 hours. The reactant was permitted to stand for a short period and 2-methyl-4-amino-5-acetaminomethylpyrimidine was obtained in crystalline form. Further quantities of the compound were obtained by salting out the mother liquor in the same manner as in Example 1. The yield was 80% of theoretical.

Having thus described the invention, what it is desired to secure by Letters Patent is:

1. Process for the production of 2-methyl-4-amino-5-acetaminomethylpyrimidine which comprises reacting an α-alkoxymethylene-β-alkoxypropionitrile with acetamidine and recovering said 2-methyl-4-amino-5-acetaminomethylpyrimidine as the reaction product.

2. Process for the production of 2-methyl-4-amino-5-acetaminomethylpyrimidine which comprises reacting a cis-α-alkoxymethylene-β-alkoxypropionitrile with acetamidine and recovering said 2-methyl-4-amino-5-acetaminomethylpyrimidine as the reaction product.

3. Process for the production of 2-methyl-4-amino-5-acetaminomethylpyrimidine which comprises reacting an α-alkoxymethylene-β-alkoxypropionitrile with acetamidine in an organic solvent system, and separating and recovering said 2-methyl-4-amino-5-acetaminomethylpyrimidine from the reaction mixture.

4. Process as claimed in claim 3 wherein the compound 2,7-dimethyl-5,6-dihydropyrimido(4,5-d)pyrimidine is obtained as an intermediate during the reaction.

5. The chemical compound 2,7-dimethyl-5,6-dihydropyrimido(4,5-d)pyrimidine, represented by the formula:

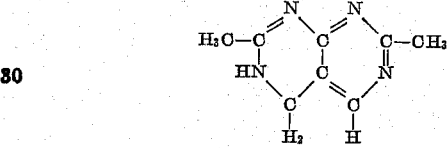

obtained as an intermediate in the reaction of an α-alkoxymethylene-β-alkoxypropionitrile with acetamidine for the production of 2-methyl-4-amino-5-acetaminomethylpyrimidine.

References Cited in the file of this patent

UNITED STATES PATENTS 2,184,720 Matukawa et al. _____ Dec. 26, 1939

FOREIGN PATENTS 819,596 France _____ Oct. 21, 1937